Figure 1:
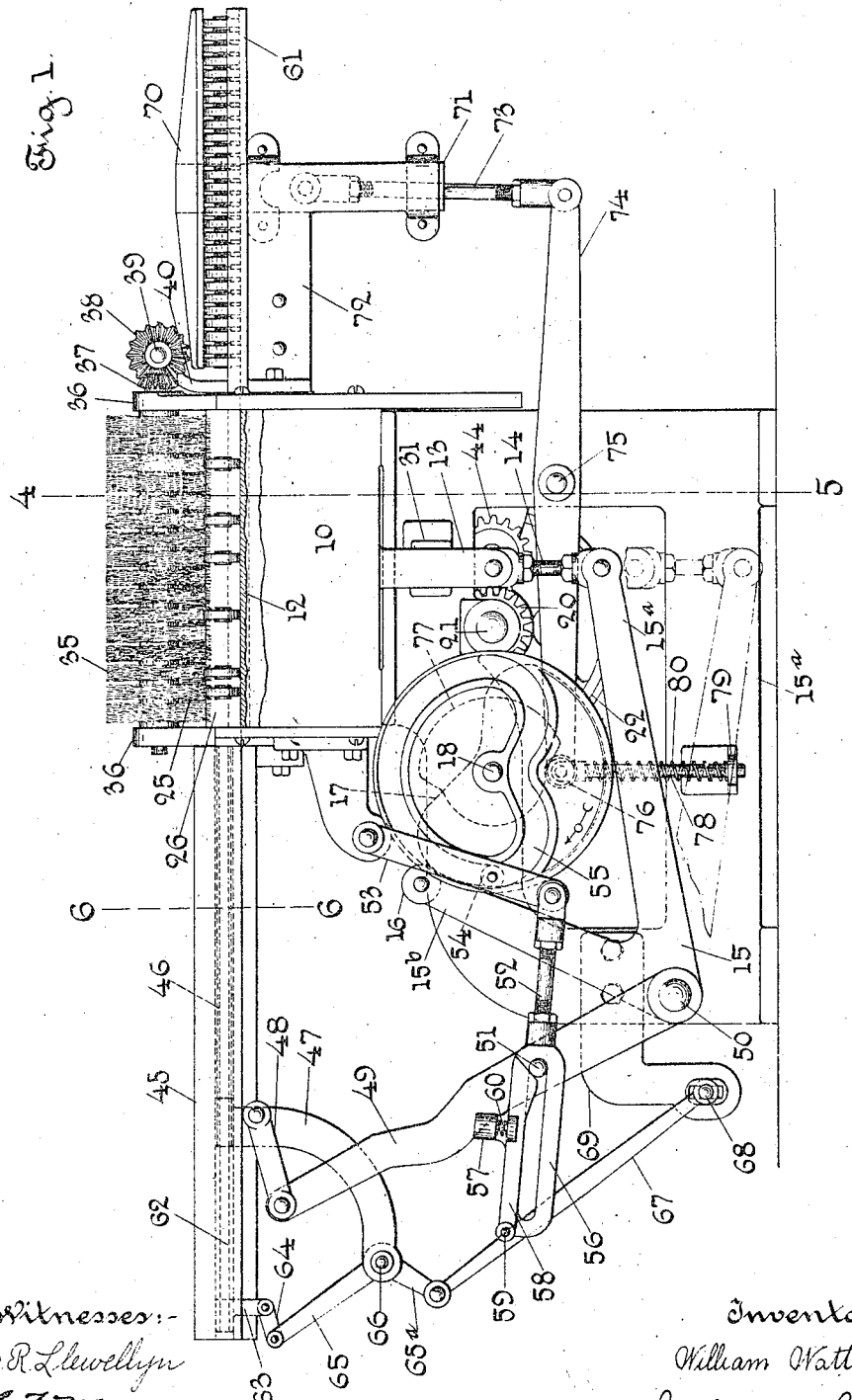

W. WATTIE.
ASSEMBLING MACHINE.
APPLICATION FILED JUNE 17, 1914.

1,132,136.

Patented Mar. 16, 1915.
4 SHEETS—SHEET 4.

Witnesses:
E. R. Llewellyn
C. F. Wesson

Inventor
William Wattie
By Southgate & Southgate
Attorneys

UNITED STATES PATENT OFFICE.

WILLIAM WATTIE, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS.

ASSEMBLING-MACHINE.

1,132,136.

Specification of Letters Patent.

Patented Mar. 16, 1915.

Application filed June 17, 1914. Serial No. 845,664.

*To all whom it may concern:*

Be it known that I, WILLIAM WATTIE, a citizen of the United States, residing at Worcester, in the county of Worcester and State of Massachusetts, have invented a new and useful Assembling-Machine, of which the following is a specification.

This invention relates to an assembling machine and particularly to a machine for assembling a plurality of cylindrical articles in axial alinement.

The machine is designed especially for assembling the spacing tubes and rolls used in the pattern chains which control the operation of loom harness mechanisms. In preparing these mechanisms for shipment it is necessary to assemble large numbers of the rolls and tubes upon small rods, which are thereafter placed in position in the pattern chains. This assembling operation has been ordinarily performed by hand and is a tiresome and comparatively expensive operation.

The object of my present invention is to provide a machine which will automatically arrange these articles in axial alinement so that they may be quickly and easily placed upon the rods above mentioned. To the accomplishment of this object my invention contemplates the provision of a hopper and a vertically movable lifting plunger reciprocating therein, the plunger having its upper face so formed that it will carry with it in its upward movement a number of the cylindrical articles.

My invention also comprises means for removing transversely from the plunger articles improperly positioned thereon and means for removing longitudinally from the plunger the articles which are properly positional in axial alinement.

Provision is also made for preventing displacement of the cylindrical articles during their longitudinal removal from the lifting plunger.

Other features of my invention will be hereinafter described and more particularly pointed out in the appended claims.

A preferred form of the invention is shown in the drawings in which—

Figure 2:
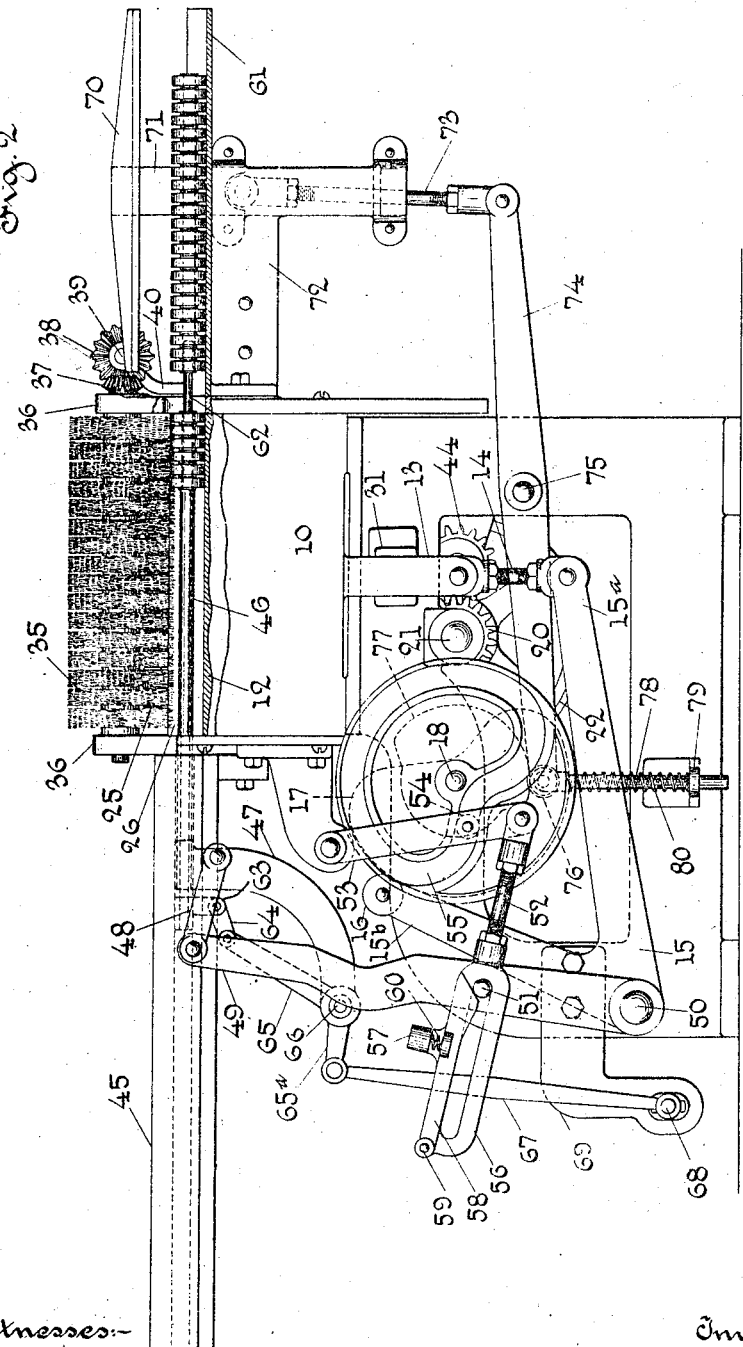
Figure 3:
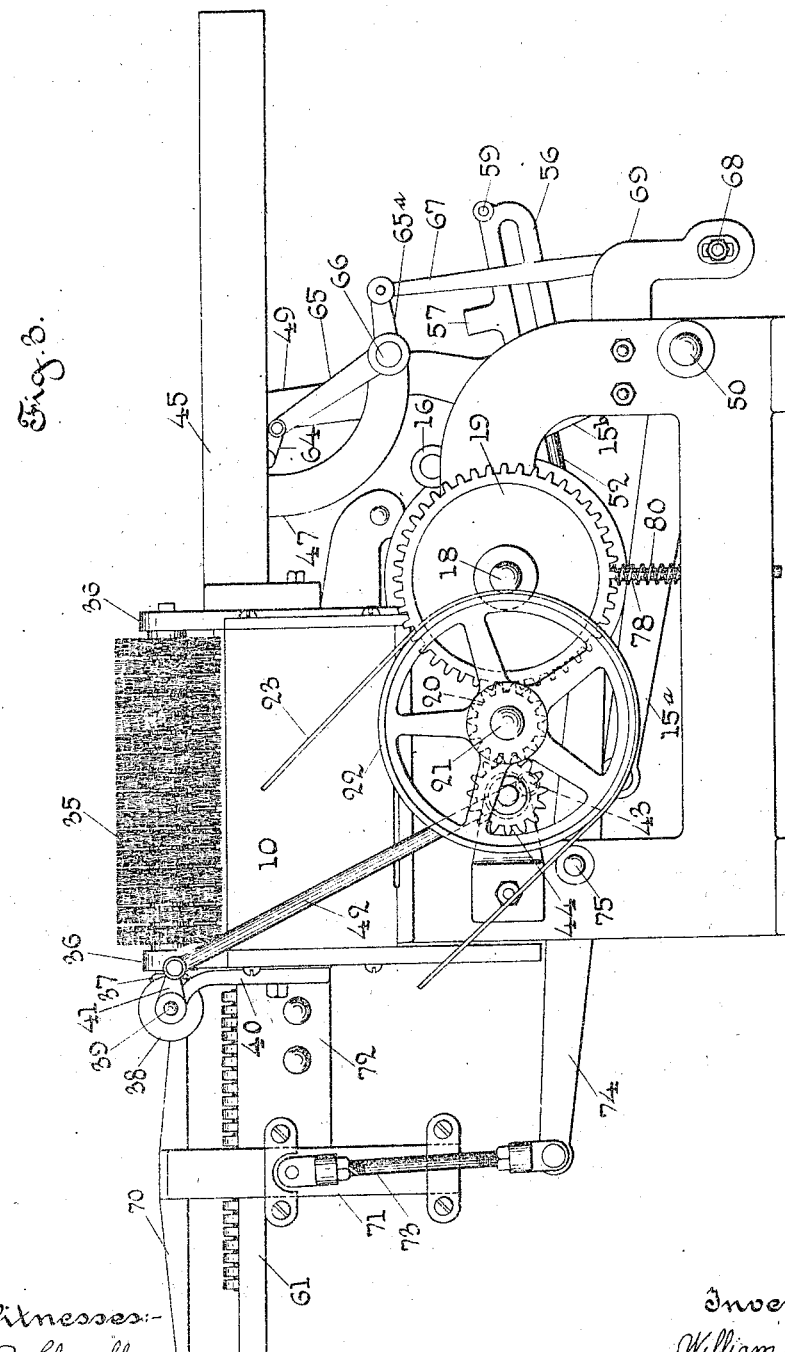
Figure 4:
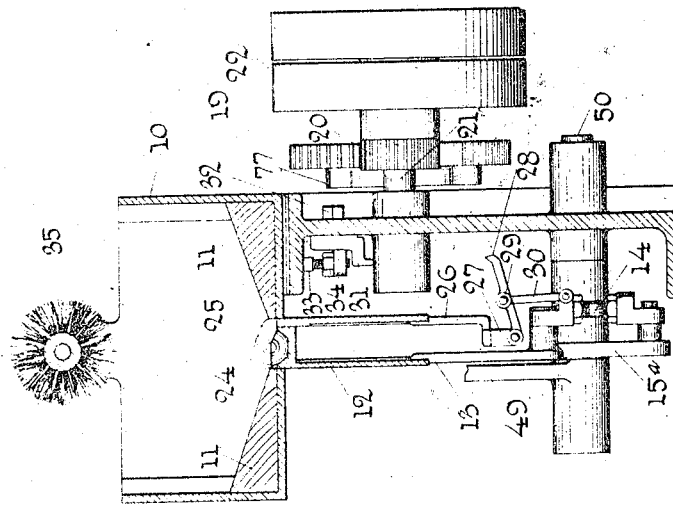
Figure 5:
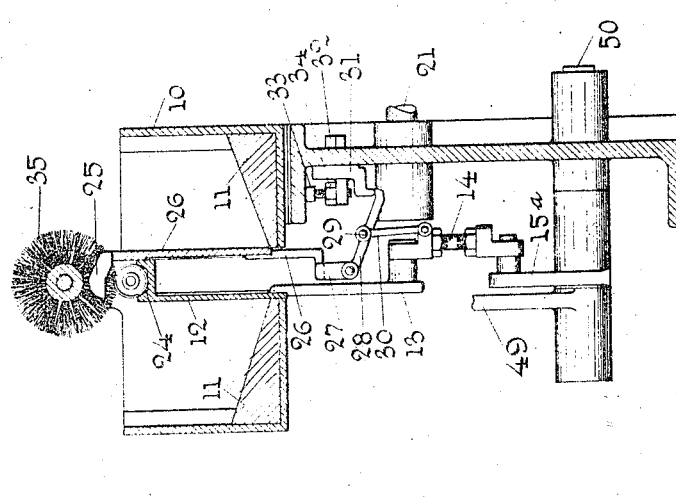
Figure 6:
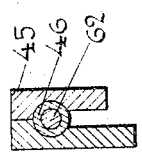

Figure 1 is a side elevation of the machine; Fig. 2 is a view similar to Fig. 1 but showing the parts in a different position; Fig. 3 is an elevation of the side of the machine opposite to that shown in Figs. 1 and 2; Figs. 4 and 5 are sectional views taken along the line 4—5 in Fig. 1 and showing the lifting plunger and its operating mechanism in two different positions, and Fig. 6 is a detail sectional view on the line 6—6 in Fig. 1.

As shown in the drawings, I have provided a hopper 10 which is open at its upper side and which may be provided, as shown in Figs. 4 and 5, with a bottom which slopes inwardly from each side to its longitudinal center line. This sloping bottom may be an integral part of the hopper itself or may be formed by inserting separate wooden blocks 11 as a false bottom in the hopper.

A lifting plunger 12 is mounted to slide vertically through a slot extending longitudinally of the hopper. The plunger 12 has a depending projection 13 connected by an adjustable link 14 to an arm 15$^a$ (Figs. 1 and 2) of the bell crank lever 15. The arm 15$^b$ of the lever 15 carries a cam roll 16 which engages a cam 17. The cam 17 is fixed upon a shaft 18 mounted in suitable bearings and having at its opposite end a gear 19 (Fig. 3) meshing with a pinion 20 upon a shaft 21 carrying a pulley 22 connected by a belt 23 to any suitable source of power. The upper surface of the lifting plunger 12 is recessed at 24 (Figs. 4 and 5) and when the plunger is moved from the position shown in Fig. 4 to that shown in Fig. 5 a number of the cylindrical articles which have fallen into the recess 24 will be raised with the plunger to its upper position.

When the machine is used for assembling certain kinds of articles a set of separators 25 is used. These separators are mounted upon a vertically sliding rod 26 (Figs. 4 and 5) and normally rest adjacent the upper surface of the plunger 12 (Fig. 4). The sliding rod 26 has a projection 27 at its lower end to which is pivoted a lever 28 supported upon a shifting fulcrum 29 formed in the upper end of a link 30 which is connected to move vertically with the plunger 12. A stop 31 (Fig. 5) is adjustably secured to the frame of the machine by a bolt 32, said stop being secured in adjusted position by a screw 33 and lock-nut 34, the screw 33 contacting with a fixed portion of the frame. As the plunger 12 moves upward the separators 25 move with the plunger until the outer end of the lever 28 contacts with the stop 31. The stop thereafter prevents further upward movement of the outer end of the lever and as the fulcrum 29 continues to move upward with the plunger 12 the rod 26 receives a differential motion which forces it upward in advance of the plunger. When the plunger reaches its extreme upper position the separators will be found in the position shown in Fig. 5. The function of the separator is to position the rolls transversely of the recess and in axial alinement thereon as shown in Fig. 1. When the machine is used for assembling tubes in which the length equals or exceeds the diameter, the separators are not necessary.

After each upward movement of the plunger a certain number of the rolls will be found in the position indicated in Fig. 1 while the other rolls will be caught in various positions upon the plunger and separators. These rolls will usually project higher than the rolls properly positioned and I provide a brush 35 to remove the improperly positioned rolls transversely from the plunger and separators. The brush 35 is mounted in bearings 36 on the frame of the machine and is provided at one end with a beveled pinion 37 (Figs. 1 and 2) meshing with a beveled gear 38 upon a short transverse shaft 39 mounted in a fixed bracket 40 (Fig. 3). At its rear end the shaft 39 carries a crank arm 41 connected by a rod 42 to a crank pin 43 mounted to rotate with a pinion 44 meshing with the driving pinion 20 upon the shaft 21. The reciprocating stroke of the rod 42 is not sufficient in extent to give a complete revolution to the shaft 39 but it communicates a to-and-fro motion thereto, thus giving the brush 35 alternating partial rotations in opposite directions. These movements of the brush 35 are effective to dislodge any rolls which have been raised by the plunger 12 and are improperly positioned thereon.

I will now describe the devices for removing the properly positioned rolls longitudinally from the plunger while it is in its raised position. A horizontally extending guide 45 (Figs. 1 and 2) is secured to the frame of the machine and provides means for longitudinally guiding a reciprocating plunger 46. This plunger has a depending member 47 secured thereto and is connected by a link 48 to a lever 49 pivoted to the frame of the machine at 50. The lever 49 carries a stud 51 connected by an adjustable link 52 to an operating lever 53. The lever 53 carries a cam roll 54 which coöperates with a cam 55, by which connections the levers 53 and 49, are reciprocated. The link 52 is connected to the stud 51 by a yielding or giveaway connection of peculiar form. This connection comprises a longitudinally slotted casting 56 having a projection 57 formed thereon and having an arm 58 pivoted thereto at 59. The arm 58 is forced downwardly by a spring 60 positioned between the arm 58 and the projection 57, and thus engages the stud 51. Should the horizontal movement of the plunger 46 be obstructed, the stud 51 will raise the arm 58 and thereafter slide freely along the slot in the casting 56 without damage to the apparatus. When the feeding plunger 46 moves to the right in Fig. 1, the separators 25 are in their raised position and the rolls are moved longitudinally along the recess in the lifting plunger 12 as shown in Fig. 2. As they pass longitudinally from the lifting plunger they are received in a grooved delivery arm 61 secured to the side of the machine.

When the machine is used with rolls of the relative dimensions shown in the drawings, it has been found desirable to prevent their displacement as they are moved axially, and accordingly I have provided a rod 62 (Fig. 2) which moves with the feeding plunger 46 but at greater speed so that it is projected from the plunger as the plunger advances, thus extending through the holes in the center of the rolls and preventing their displacement. This rod 62 has a depending arm 63 (Fig. 1) secured thereto at the rear end, which is pivotally connected by a link 64 to a bell crank 65 pivoted at 66 to the depending member 47 secured to the plunger 46. The arm 65ª of the bell crank 65 is connected by a link 67 to a stud 68 adjustably secured in a fixed bracket 69. As the plunger 46 is moved to the right, the link 67 causes the bell crank 65 to turn upon its pivot 66 and the relative lengths of the arms of the bell crank result in giving the rod 62 a differential movement at greater speed than the plunger 46. The rod is thus projected in advance of the plunger and by extending through the holes in the rolls prevents their lateral displacement. I have also provided means for holding the rolls on the delivery arm 61 between the feeding movements of the plunger 46. This means comprises a clamp 70 (Figs. 1 and 2) mounted upon a bar 71 suitably guided for vertical movement in the bracket 72 which supports the delivery arm 61. The bar 71 is connected by an adjustable link 73 to a lever 74 pivoted to the frame at 75 and having a cam roll 76 coöperating with a cam 77 mounted upon the shaft 18. A rod 78 is connected to the lever 74 upon the same pivot as the cam roll 76 and slides vertically in a bearing 79. A coil spring 80 surrounds the rod 78 and forces the roll 76 upwardly against the cam 77. The clamp 70 is thus positively raised by the cam 77, but is yieldingly forced downward by the spring 80 and also by its own weight. The cam 77 is so timed that the clamp 70 will be raised during the feeding movement of the plunger 46 and at other times will hold the rolls upon the delivery arm 61 against accidental displacement.

The operation of the machine has been indicated in connection with the foregoing description but may be briefly summarized as follows. A supply of rolls or tubes is placed in the hopper 10 and at each raising of the plunger 12 a certain number of these rolls will be positioned as shown in Figs. 1 and 5. As the plunger reaches its upper limit the separators 25 are moved above the rolls and the brush 35 removes the improperly positioned rolls transversely. The clamp 70 is raised and the feeding plunger 46 moves forward to transfer the properly positioned rolls to the delivery arm. At the same time, the rod 62 advances faster than the plunger 46 and is projected through the center of the rolls thus preventing their displacement during transfer. As the rod and feeding plunger are withdrawn, the plunger 12 descends for a fresh load and the clamp 70 prevents the displacement of the rolls upon the delivery arm. While the rolls are held in this position the attendant passes a rod through the required number of rolls and removes them from the delivery arm as the clamp 70 is again raised.

When the machine is used for assembling cylindrical articles in which the length is greater than the diameter the separators 25 are unnecessary and the reciprocating rod 62 can also be omitted. The brush 35 will, of course, be positioned vertically to correspond with the diameter of the articles being assembled.

Having thus described my invention it will be evident that many changes and modifications can be made therein by one skilled in the art without departing from the spirit and scope thereof as expressed in the claims and I do not wish to be limited to the details herein described except as required by the claims, but

What I do claim is:—

1. An assembling machine having, in combination, a hopper adapted to contain a plurality of cylindrical articles, a lifting plunger vertically movable in said hopper to elevate and aline certain of the articles contained therein, means for removing transversely from said plunger articles improperly positioned thereon, and means for thereafter removing longitudinally from said plunger the articles properly alined thereon.

2. An assembling machine having, in combination, a hopper adapted to contain a plurality of cylindrical articles, a lifting plunger having a recess in its upper face and vertically movable in said hopper to elevate and aline certain of the articles contained therein, a brush movable transversely of said recess to remove articles improperly positioned therein, and a second plunger for forcing the properly alined articles longitudinally out of said recess.

3. An assembling machine having, in combination, a hopper adapted to contain a plurality of cylindrical articles, a lifting plunger vertically movable in said hopper to elevate and aline certain of the articles contained therein, a rotatable device movable transversely of said plunger to remove therefrom articles improperly positioned thereon, means partially to rotate said device, and means to remove the properly alined articles longitudinally from said plunger.

4. An assembling machine having, in combination, a hopper adapted to contain a plurality of articles, a lifting plunger movable in said hopper to elevate and position certain of said articles, a device mounted to rotate transversely of said plunger to remove improperly positioned articles therefrom, and means to give said rotatable device partial rotary movements in alternate directions.

5. An assembling machine having, in combination, a hopper adapted to contain a plurality of cylindrical articles, a lifting plunger vertically movable in said hopper to elevate and aline certain of said articles contained therein, a plurality of separators positioned above said plunger and vertically movable therewith, and means to give said separators an additional upward movement beyond the upper limit of travel of said plunger.

6. An assembling machine having, in combination, a hopper adapted to contain a plurality of cylindrical articles, a lifting plunger vertically movable in said hopper to elevate and aline certain of said articles contained therein, a plurality of separators positioned above said plunger and vertically movable therewith, means to give said separators an additional upward movement beyond the upper limit of travel of said plunger, and a revolving brush operating between said separators to remove improperly positioned articles from said plunger.

7. An assembling machine having, in combination, a hopper with a bottom slanting downwardly from both sides toward the longitudinal center line thereof and adapted to contain a plurality of cylindrical articles, a lifting plunger having a recess in its upper face and positioned along said center line, means to raise the plunger periodically, and means to remove from said plunger the articles positioned thereon.

8. An assembling machine having, in combination, a hopper adapted to contain a plurality of cylindrical articles, a delivery arm mounted in fixed relation to said hopper, means movable relative to said hopper for assembling and axially alining certain of said articles, and means for feeding said articles to said delivery arm.

9. An assembling machine having, in combination, means to aline cylindrical articles having axial openings therethrough, a feeding plunger for moving the alined articles axially, and a rod mounted within said plunger and movable therewith but at greater relative speed, said rod being thus projected in advance of said plunger through the axial openings in said articles and being effective to prevent their displacement during their movement by the feeding plunger.

10. An assembling machine having, in combination, a hopper adapted to contain a plurality of cylindrical articles, means movable relative to said hopper for elevating and axially alining certain of said articles, a delivery arm mounted in fixed relation to said hopper, a feeding plunger movable longitudinally of said hopper to transfer the elevated articles to said arm, and a rod positioned within said plunger and differentially movable with respect thereto into a position in advance thereof, said rod in its differential movement being projected through axial openings in the alined articles and thereafter holding them from displacement during their transfer to the delivery arm.

11. An assembling machine having, in combination, a hopper adapted to contain a plurality of cylindrical articles, a delivery arm mounted in fixed relation to said hopper, means movable relative to said hopper to assemble and aline certain of said articles and to transfer them to the delivery arm, and a clamp operative to hold the articles from displacement upon said arm, said clamp being movable out of operative position during the transfer of the articles to said arm.

12. An assembling machine having, in combination, means to axially aline cylindrical articles, means to feed the alined articles longitudinally, means to drive said feeding means, and connections between said driving means and said feeding means, said connections including a pivoted spring-pressed member adapted to yield and release said feeding means whenever the feeding movement is unduly opposed.

13. An assembling machine having, in combination, a hopper adapted to contain a plurality of cylindrical articles, a lifting plunger vertically movable in said hopper to elevate and aline said articles, a plurality of separators positioned above the plunger and movable therewith and means to move said separators away from said plunger as the plunger reaches its upper limit of travel.

14. An assembling machine having in combination a hopper adapted to contain a plurality of cylindrical articles, an assembling device movable relative to said hopper for axially alining certain of said articles, and means for thereafter axially removing the alined articles from said device.

15. An assembling machine having in combination a hopper adapted to contain a plurality of cylindrical articles, an assembling device movable relative to said hopper for axially alining certain of said articles, means for removing from said device articles improperly positioned thereon, and additional means for thereafter removing from said device the articles properly alined thereon.

In testimony whereof I have hereunto set my hand, in the presence of two subscribing witnesses.

WILLIAM WATTIF.

Witnesses:
E. H. RYAN,
W. M. WATTIE.